(12) United States Patent
Tiu et al.

(10) Patent No.: US 9,119,386 B2
(45) Date of Patent: Sep. 1, 2015

(54) DRIVE SYSTEM FOR A MOBILE SPRAYER AND/OR FOR A MOBILE BLOWER

(75) Inventors: David Tiu, Plympton (AU); Brendan Deck, Torrens Park (AU)

(73) Assignee: Croplands Equipment Pty Ltd., Dry Creek, South Australia (AU)

( * ) Notice: Subject to any disclaimer, the term of this patent is extended or adjusted under 35 U.S.C. 154(b) by 806 days.

(21) Appl. No.: 13/259,069

(22) PCT Filed: Mar. 24, 2010

(86) PCT No.: PCT/AU2010/000338
§ 371 (c)(1),
(2), (4) Date: Dec. 7, 2011

(87) PCT Pub. No.: WO2010/108221
PCT Pub. Date: Sep. 30, 2010

(65) Prior Publication Data
US 2012/0085836 A1    Apr. 12, 2012

(30) Foreign Application Priority Data
Mar. 24, 2009 (AU) ................................ 2009901241

(51) Int. Cl.
*A01M 7/00* (2006.01)
*A01M 9/00* (2006.01)
*B05B 13/00* (2006.01)
*B05B 13/02* (2006.01)

(52) U.S. Cl.
CPC ............. *A01M 7/0014* (2013.01); *A01M 9/003* (2013.01); *B05B 13/005* (2013.01); *B05B 13/02* (2013.01); *B05B 13/0278* (2013.01)

(58) Field of Classification Search
CPC .. A01M 7/0014; A01M 9/003; B05B 13/005; B05B 13/02; B05B 13/0278
USPC ........... 239/77, 147, 160, 161, 166, 169, 172, 239/175, 176, 222, 222.11
See application file for complete search history.

(56) References Cited

U.S. PATENT DOCUMENTS

| 2,920,434 | A | * | 1/1960 | Ingram | 56/10.6 |
| 3,409,221 | A | * | 11/1968 | Patterson | 239/8 |
| 3,655,130 | A | * | 4/1972 | Patrick | 239/77 |
| 4,541,160 | A | | 9/1985 | Roberts | |
| 5,113,640 | A | * | 5/1992 | Colistro | 56/6 |
| 5,372,305 | A | * | 12/1994 | Ballu | 239/77 |
| 5,921,019 | A | * | 7/1999 | Baek | 47/1.7 |

(Continued)

FOREIGN PATENT DOCUMENTS

| CN | 2831772 Y | 1/2006 |
| GB | 713312 A | 8/1954 |

(Continued)

OTHER PUBLICATIONS

WIPO, Australian International Search Authority, International Search Report mailed Jun. 8, 2010 in International Patent Application No. PCT/AU2010/000338, 5 pages.

*Primary Examiner* — Ryan Reis
(74) *Attorney, Agent, or Firm* — Inskeep IP Group, Inc.

(57) ABSTRACT

The present invention provides a drive system for a mobile blower or a mobile sprayer. The drive system includes at least one flexible cable drive which connects a fan unit of the mobile blower or the mobile sprayer to a rotary power source to drive the fan. The present invention also provides mobile blowers and mobile sprayers including the drive system.

34 Claims, 11 Drawing Sheets

(56) References Cited

U.S. PATENT DOCUMENTS

| | | | |
|---|---|---|---|
| 6,202,941 B1 * | 3/2001 | Baek | 239/161 |
| 6,786,701 B1 * | 9/2004 | Huang et al. | 417/199.1 |
| 2005/0150326 A1 | 7/2005 | Daniel | |

FOREIGN PATENT DOCUMENTS

| | | |
|---|---|---|
| JP | 11300250 A | 11/1999 |
| KR | 100776590 B1 | 11/2007 |

* cited by examiner

DRIVE SYSTEM FOR A MOBILE SPRAYER AND/OR FOR A MOBILE BLOWER

PRIORITY CLAIM

This application claims priority to International Patent Application No. PCT/AU2010/000338, International Filing Date 24 Mar. 2010, entitled Drive System For A Mobile Sprayer And/Or For A Mobile Blower, and to Australian provisional patent application 2009901241, filed on 24 Mar. 2009, the contents of both of which are incorporated herein by reference in their entireties.

FIELD OF THE INVENTION

The present invention relates to a drive system for a mobile sprayer and/or for a mobile blower. The present invention also relates to a mobile blower for blowing an airstream onto plants and a mobile sprayer for spraying a substance onto plants.

BACKGROUND OF THE INVENTION

In the absence of perfect growing conditions (adequate water supply, nutrients and an nonexistence of pests), agricultural or horticultural grown plants require treatment by man. Such treatments may include, for example, removal of debris, fungal treatment, drying, watering, nutrient delivery or application of pesticides/herbicides to the plants. These treatments may involve blowing an airstream onto the plants. Alternatively, substances, in liquid or powder form, may be dispensed into the airstream to apply the substance to the plant in a spray.

In agriculture, plants may be grown in rows to enable treatments to be easily applied to the plants and/or to assist in the harvesting of the plants. Examples of such plants planted in rows include grape vines and fruit trees. The rows may be spaced apart so as to allow a vehicle or a tyre of a vehicle to travel between the rows.

To maximise the efficiency with which plants are treated with substances, mobile sprayers may be used to apply a substance to the plants. A range of sprayers may be used, including sprayers that generate a spray by dispensing a substance into the air flow of a fan. Mobile sprayers are able to be attached to, and moved along with, a vehicle. Particular mobile sprayers may utilise power from the vehicle to drive the fans, with the power from the vehicle being converted to hydraulic or electric power to drive the fans of the sprayer. However, such an arrangement generally requires individual motors for each fan.

For a hydraulic drive system of a mobile sprayer, the fans are likely to be mounted a distance from the vehicle. As such, the length of hydraulic hosing and hydraulic fluid to directly power motors provided for each fan can be costly and inefficient. Hydraulic drive systems may also be subject to leakage, which would not only require significant repair and/or maintenance but can also cause damage to crops, particularly if the leak is close to the fan units.

In relation to electrical drive systems, disadvantages include the bulk associated with electric motors, the cost of self-contained 3 phase power generators, and the fact that installation and servicing must be performed by specialists. Furthermore, spraying substances in the vicinity of high voltages, which are required for electrical drive systems, increases the operating risk of the mobile sprayer.

It is desirable to provide an alternative drive system, which can form part of an efficient mobile blower for blowing an airstream onto plants and/or an efficient mobile sprayer for applying a substance to plants, the drive system being simple in design, structure and/or operation.

A reference herein to a matter which is given as prior art is not to be taken as an admission that that matter was known, or that the information it contains was part of the common general knowledge, as at the priority date of any of the claims.

SUMMARY OF THE INVENTION

The present invention provides a drive system for a mobile blower, the mobile blower including:

i) a frame; and ii) at least one fan unit for generating an airstream, each fan unit including a fan;

wherein the drive system includes at least one flexible cable drive, and wherein, in use, the at least one fan unit is attached to the frame and a flexible cable drive, the flexible cable drive being engageable with a rotary power source for transferring rotary power from the rotary power source to the at least one fan unit to drive the fan(s).

The present invention also provides a drive system for a mobile sprayer, the mobile sprayer including:

i) a frame; and ii) at least one fan unit for generating an airstream, each fan unit including a fan and at least one substance dispensing element for dispensing a substance into the airstream to generate a spray;

wherein the drive system includes at least one flexible cable drive, and wherein, in use, the at least one fan unit is attached to the frame and a flexible cable drive, the flexible cable drive being engageable with a rotary power source for transferring rotary power from the rotary power source to the at least one fan unit to drive the fan(s).

Drive systems according to the present invention allow the transfer of rotary power from a rotary power source to at least one fan unit and may include a gearbox to modulate the rotary power from the rotary power source. For drive systems which include multiple fan units, the present invention may alleviate the need to provide each fan unit with its own motor, as the one rotary power source may be arranged to drive all the fans of a mobile blower or mobile sprayer. This can significantly reduce manufacturing and maintenance costs and provide greater consistency in the operation of the individual fans (i.e. as each fan is powered by the same rotary power source, all the fans are more likely to operate at the same speed).

The present invention also provides a mobile blower for blowing an airstream onto plants, the system including:

i) a frame;

ii) a drive system including at least one flexible cable drive; and iii) at least one fan unit for generating an airstream, each fan unit including a fan; and wherein the at least one fan unit is attached to the frame and a flexible cable drive, the flexible cable drive being engageable with a rotary power source for transferring rotary power from the rotary power source to the at least one fan unit to drive the fan(s).

The present invention also provides a mobile sprayer for applying a substance to plants, the system including the mobile blower, wherein the fan unit(s) further include(s) at least one substance dispensing element for dispensing a substance into the airstream(s) to generate a spray, the at least one substance dispensing element being in fluid communication with a substance supply.

Mechanical engagement between the rotary power source and the fan unit by the flexible cable drive permits a drive system for a mobile blower or mobile sprayer that is simple. In particular, components required by hydraulic or electrical drive systems may be omitted or at least minimised for embodiments whereby the rotary power source is a hydraulic motor or electric motor. For example, if the rotary power source is a hydraulic motor, the hydraulics may be as simple as connecting the hydraulics of a tractor to a hydraulic motor or connecting a hydraulic pump to the hydraulic motor. Long hydraulic hoses connected to the fan units are no longer required.

Furthermore, the use of flexible cable drives in the drive system of the present invention to transfer the rotary power from the rotary power source to the one or more fan units, allows flexibility in the design of the blower or sprayer. For instance, flexible cable drives, as opposed to rigid mechanical drives, do not require straight-line engagement between components, as the flexible cable drive may be bent around structures while still retaining functionality.

The flexibility of a flexible cable drive may also be used to afford manoeuverability of the position and/or angle of individual fan units relative to the mobile blower or mobile sprayer, as a flexible cable drive is able to bend. In this regard, the fan units may be pivotally attached to the frame to allow the angle of the fan units to be adjusted. Mechanical drives other than flexible cable drives would require further components to achieve the same result, adding to the complexity of the mobile blower or mobile sprayer.

Further applications and/or advantages of the flexible cable drive in the drive system of a mobile blower or mobile sprayer will be further discussed below.

The flexible cable drives (also known as flexible shaft drives) comprise a core and a flexible casing. The flexible casing may be made from a range of suitable materials including, for example, plastics, metals, rubbers, textile braiding etc. The casing is preferably secured against rotation to enable rotary power to be transferred through the core without rotation of the casing itself. Preferably, the casing is secured at the terminal ends of the casing and may also be supported by clamps, cable ties, hooks or the like at points along the length of the casing. Rotation of the core is measured by revolutions per minute (rpm). The core may be composed of a range of suitable materials including, for example, metals, rubber or composite materials. Particularly suited metals include carbon steel, stainless steel, tempered steel, music wire, rocket wire, bronze alloys and copper alloys. The form of the core may include, for example, tightly wound wires, cables or coils. When flexible cable drives are used, which include wound cores, it is desirable that the direction of winding is complementary to the direction the core will be rotated to minimise loosening or unwinding of the core. The core typically includes terminal attachment elements for attaching to a rotary power source at one end and the desired device at the other end. The attachment elements need not be the same at each end.

Many flexible cable drives are entirely enclosed and require little to no maintenance. A range of different flexible cable drives may be used which differ in their maximum speed, torque capacity, diameter, minimum bend radius, length, stiffness, torsional deflection and axial stretch. The optimal flexible cable drive for a particular mobile blower or mobile sprayer may be determined by following manufacturer's guidelines. While a person skilled in the art would appreciate that a range of different flexible cable drives may be used for different mobile blowers or mobile sprayers, flexible cable drives that are used in some embodiments will now be described to provide the reader with context as to the type of flexible cable drives that may be used.

For relatively small fan units (e.g. fan units with 200 mm to 400 mm diameter fans), an exemplary flexible cable drive has a core with a diameter of about 9.6 mm consisting of multiple strands of high tensile wire wound in the direction that absorbs the fan torque. The flexible casing consists of a flexible steel conduit of 11 mm inner diameter and 16 mm outer diameter and is covered with PVC/urethane/rubber sheath of 18 mm diameter. The sheath may also be made of other similar materials and may include a textile braid between the steel conduit and the sheath. Swaged to the outer conduit are push button quick release couplings of 22 mm diameter that locate into the gearbox and fan units. The flexible cable drive has a length of about 2.5 m, although shorter or longer cables may be used (e.g. between 1.4 m and 8 m). The flexible cable drive has a recommended operational speed of 2500 rpm, with a maximum recommended speed of 3000 rpm. The recommended minimum bend radius is 150 mm. The inner cable ends are formed with square male ends to engage into the female adaptors on the gearbox and the fan units. Flexible cable drives of differing specification and/or with different attachment elements may also be used.

For example, larger flexible cable drives may be used, which are particularly suited for larger fan units (e.g. fan units with 400 mm to 1000 mm diameter fans). An exemplary flexible cable drive for 400 mm to 500 mm fan units has a core with a diameter of 12 mm to 13 mm. The flexible casing consists of a flexible steel conduit covered with PVC/urethane/rubber sheath. The sheath may also be made of other similar materials and may include a textile braid between the steel conduit and the sheath. The flexible casing has a 15 mm to 16 mm inner diameter and 26 mm outer diameter. Push button quick release couplings of around 27.6 mm are swaged to the flexible casing to located into the gear box and fan units. This flexible cable drive has an ideal maximum speed of around 3000 rpm and a recommended operational speed of 2200 rpm to 2600 rpm. The recommended minimum bend radius is 240 mm. Preferably, the flexible cable drive has a length of 1.4 m to 3 m, although cables up to 8 m long may be used. The inner cable ends are formed with 10.2 mm square male ends to engage into the female adaptors on the gearbox and the fan units.

While attachment elements comprising square male ends have been described above, it will be appreciated that the attachment elements may comprise a number of different configurations. For example, the attachment elements may be rectangular, spherical shaped, or male or female threaded. In fact, any configuration of attachment elements may be used that enables rotary power to be transferred from the rotary power device to the core of the flexible cable drive and from the core of the flexible cable drive to a fan unit.

The attachment element may attach directly to the fan of the fan unit and/or the rotary power source. Alternatively, adapters including complementary configurations to the attachment elements may be used as an intermediary between the flexible cable drive and the fan of the fan unit and/or rotary power source or to connect two flexible cable drives to increase the distance between the rotary power source and a fan unit. The adaptors may include, for example, a cable joiner, a straight connector, a T section gearbox, a right angle drive or other suitable adaptor. The adapters may also comprise a gear box to modulate the rotary power of the flexible cable drive relative to the fan. The modulation may be a reduction or increase in the revolutions per minute of the fan relative to the flexible cable drive. Alternatively, the adaptor may comprise a 1:1 ratio.

The source of the rotary power is not limited, provided that it allows the blower or sprayer to be mobile. The rotary power source may include a power take off shaft, an electric motor, an internal combustion motor or a hydraulic motor. In each case, the rotary power from the rotary power source is transferred by the flexible cable drive(s) to the fan unit(s).

The mobile blower or mobile sprayer may be mounted on a vehicle or a trailer towed by a vehicle. In this regard, the mobile blower or mobile sprayer may utilise the rotary power source from the vehicle. Alternatively, the rotary power source may be independent to the vehicle (i.e. self-propelled). For example, the rotary power source may be generated by an electric or internal combustion motor or other power means on a trailer towed by the vehicle. In particular embodiments, the electric motor may be powered by solar power.

The vehicle may be a car, motorbike, ute, truck or agricultural vehicle including, for example, a tractor or a harvester.

In its simplest form, the drive system may comprise a single flexible cable drive engageable with a rotary power source at one end and connected to a single fan unit at the other end. In this form, the speed at which the fan of the fan unit is driven is dependent on the rotary speed of the rotary power source.

While this simple form of the drive system may be suitable for some mobile blowers and/or mobile sprayers, preferred embodiments of the invention utilise a gearbox to modulate the rotary power from the rotary power source. In these embodiments, the gearbox engages with the rotary power source. One or more flexible cable drives may be connected to the gearbox with the rotary power from the rotary power source being modulated by the gearbox to drive the fan of one or more fan units. The gearbox may be used to increase or decrease the revolutions per minute of the fan relative to the rotary power source.

While, the gearbox will preferably have a gear ratio of between 1 and 8, it will be appreciated that gearboxes with gear ratios less than 1, or greater than 8, may be suitable for some drive system arrangements and these are also contemplated by the present invention. The gearbox may comprise either fixed or variable gear ratios. Use of a variable ratio gearbox is advantageous for embodiments where a level of control of the fan speed is desired. This may be particularly useful when it is desired to use the mobile blower or mobile sprayer on different plants which may have different sizes and/or spraying requirements or if it is desired to increase the speed of the vehicle, whereby an increased speed of the fans may be required to maintain adequate blowing/spraying.

As will be appreciated, the drive system may be used with a range of different sized fans and at a range of different fan speeds. While fans with a diameter of between 250 mm and 1000 mm may be used, exemplary mobile blowers/sprayers may use one or more fans with a diameter of approximately 380 mm, 500 mm, 620 mm, 820 mm or 920 mm. The one or more fans are driven by the flexible cable drives to preferably operate at between 1000 rpm and 4000 rpm, although it will be appreciated that other fan speeds may be used.

In some embodiments, the fan units may include a SARDI fan substantially as described in Furness et al., The Australian & New Zealand Grapegrower & Winemaker, September 2003, pages 64-74, the contents of which are incorporated herein by reference. It will be appreciated that the present invention may utilise other fan designs and types.

Croplands Australia fan units that include a SARDI fan with a 380 mm diameter are preferably operated at between 2000 rpm and 3000 rpm (optimally at around 2600 rpm). At 3000 rpm, the 380 mm diameter fans use 1.08 kW of power and 3.44 Nm torque. Croplands Australia fan units that include a SARDI fan with a 500 mm diameter are preferably operated at between 1750 rpm and 2750 rpm (optimally at around 2200 rpm). At 3000 rpm, the 500 mm diameter fans use 2.52 kW of power and 8.02 Nm torque.

The selection of the fan size, the number of fans, and the arrangement of fan units will depend on the blowing/spraying application. For example, for some applications it may be desirable to have a single large (e.g. 620 mm to 920 mm diameter) fan unit. For other applications, 2 to 16 fan units may be used for one mobile blower or mobile sprayer. Preferably, mobile blowers/sprayers with a large number of fan units will utilise smaller fans (e.g. fans with a 300 mm to 500 mm diameter).

The drive system may advantageously utilise a soft start and/or a soft finish to optimise efficiency and minimise the potential for damage to the flexible cable drive and/or the fan units. A "soft start", as used herein, is intended to mean that there is a delay in the flexible cable drive reaching its working speed after the rotary power source is initiated. Thus, if a flexible cable drive is to operate at a speed of 2500 rpm, the soft start may be used to allow the speed of the flexible cable drive to build up relatively slowly (e.g. over 1-5 seconds) to 2500 rpm, as opposed to being immediately jerked to full speed.

The soft start may involve an electrical soft start, a mechanical soft start or a combination of both. Electrical soft starts generally function by initially restricting the current applied to an electric motor. Methods and apparatus for electrical soft starting an electrical motor are generally known in the art and may include, for example, a triac, a Y-Δ start, a direct on line starter, a logic controller or current limiting and voltage ramp-up electronic equipment. Mechanical soft starts may include a clutch, fluid couplings or electromagnetic arrangements. For example, a car-type pressure plate clutch may be used to soft start the rotary power source and/or flexible cable drive(s). The car-type pressure plate clutch may be used in conjunction with a multi-speed gearbox or to engage a PTO shaft. An electrical actuator may also be used.

Soft starts for hydraulic motors may comprise a fluid coupling such as a hydraulic accumulator, which may be purely mechanical or combined with an electronic control. Hydraulic accumulators may include, for example, gas-charged accumulators, spring type accumulators or metal bellows type accumulators. As the accumulator accepts hydraulic fluid when the hydraulics are initiated, there is a delay in the time taken for the hydraulic motor to be engaged to full speed. While different accumulators may be selected to control the rate at which the hydraulic motor reaches full speed, in some embodiments, it may be desirable to use an accumulator that results in a 1-5 second delay between initiation of the hydraulics and the hydraulic motor reaching full speed. Valves (e.g. anti-cavitation valves) may also be included to provide the hydraulic motor with a slow finish.

In some embodiments, the soft starts described above may also provide for a soft finish (i.e. allow the flexible cable drives and fans to slow down slower than the rotary power source). In a similar manner to the soft start, the soft finish can reduce damage to the flexible cable drive(s) and/or the fan(s) by preventing them from coming to an abrupt halt when the rotary power source is terminated. Alternatively, a separate soft finish may be may be included. For example, the drive system may comprise a one-way overdrive clutch bearing to allow the fan and/or flexible cable drive to overdrive when powering down. One-way overdrive clutch bearings similar in principle to those on bicycle wheels may be used.

The mobile blower and mobile sprayer both generate an airstream. For a mobile blower, the airstream alone may be used on plants to remove debris, dry the plants, or remove/treat fungus or the like on the plants. Alternatively, a mobile sprayer may be used to apply a substance to the plants. In such embodiments, it is desirable for the fan units to further comprise one or more substance dispensing elements for applying the substance to the plants via the generated airstream.

The mobile blower and the mobile sprayer may use a range of fan units including, for example, axial, turbine or tangential fan units. For embodiments including substance dispensing elements, the substance may be dispensed from the substance dispensing element(s) onto the fan or ideally into the airstream generated by the fan to propel the substance as a spray. In this regard, the substance dispensing elements may be positioned in front, behind or adjacent to the fan. The substance dispensing elements preferably include spray nozzles to maximise the dispersion of the substance as a spray, particularly when the substance is a liquid.

In some embodiments with multiple fan units, the fan units may be arranged in a parallel drive arrangement from a gearbox. In a parallel drive arrangement, each fan unit in the arrangement is driven by a separate flexible cable drive, with each flexible cable drive being connected to the gearbox. Such an arrangement may allow individual operation of fan units, without affecting the performance of other fan units. Furthermore, parallel drive arrangements allow flexible cable drives with smaller diameters to be used and each fan unit may require less energy compared to a series arrangement.

Multiple fan units may also be arranged in a series drive arrangement. In a series drive arrangement, each fan unit in the arrangement is driven by the same flexible cable drive from the rotary power source or gearbox. Preferably, one or more fan units in the series drive arrangement include a T section gearbox. A T section gearbox allows a rotary input and two rotary outputs. Thus, one rotary output may be used to drive the fan of a first fan unit and the other rotary output may be used to drive a flexible shaft connected to the next T section gearbox to drive a second fan unit and so on. Thus, the T section gearbox acts as a series connector between the fan units in the series drive arrangement. A series drive arrangement can be useful when the fan units are positioned at a distance from the rotary power source or gearbox, as it can minimise the total length of flexible cable drive required for the mobile blower or mobile sprayer.

The mobile blowers and mobile sprayers may comprise fan units in a parallel drive arrangement and fan units in a series drive arrangement. Indeed, some of the fan units may be part of both a series and parallel drive arrangement. For example, the mobile blowers and mobile sprayers may comprise multiple pairs of fan units, wherein each fan unit in each pair is arranged in a series drive arrangement and each pair of fans is arranged in a parallel drive arrangement.

In some embodiments, each fan unit in a parallel drive arrangement may be operated individually. For example, each of the fan units may be individually engaged or disengaged from the rotary power source. Preferably, the engagement/disengagement is controlled at the gearbox. Similarly, in some embodiments, each of the series drive arrangements may be operated individually. For example, each of the series drive arrangement may be individually engaged or disengaged from the rotary power source.

The control over individual fan units or series drive arrangements may be useful to prevent waste when particular fan units are not required for a particular blowing/spraying job, such as when blowing/spraying the end row of plants.

Fan units may be attached to the frame using frame connectors. For example, the frame connector may be a collar, clamp or other fitting and may include an arm to position the fan unit away from the frame. The connection between the arm and the fan unit may be a pivoting connection to allow the angle of the fan unit to be changed. The frame connector may be rigid and permanently attached to the frame or may be adjustable, allowing pivoting and/or movement of the fan unit along the frame. The position and/or angle of the fan unit on the frame may be adjusted by loosening the adjustable frame connector, moving or pivoting the fan unit along the frame to the desired position and/or angle and retightening the adjustable frame connector. In this regard, the fan units may be angled and positioned to direct the airstream to the plants from the side, above or at an angle below or an angle above the plants. Flexible cable drives facilitate such angle and position changes of the fan units by bending.

The frame acts to support the fan units. Fan units may be attached to the frame in arrangements to maximise coverage of the plants with the airstream/spray. As can be appreciated, different arrangements will suit different plants. For example, while it may be desirable to blow an airstream onto plants or apply a substance to plants in a vineyard from the side and above and below the plants (requiring a vertical arrangement of fan units), ground crops, such as strawberries, may benefit from blowing an airstream or applying a substance from above (i.e. a horizontal arrangement of fan units blowing downwards).

Accordingly, the frame may take the form primarily of a horizontal boom, a vertical boom, a tower or a combination of any of these. In some embodiments, the fan units are arranged to allow concurrent airstreams to blow/apply substance to multiple rows of plants. Fan units may therefore be arranged to point in different directions and blow air and/or apply substance to one side of two rows of plants.

The frame may be configured to straddle a plant or a row of plants with fan units arranged thereon to allow concurrent airstreams to blow/apply substance to both sides of the plant or row of plants. In these embodiments, the frame is likely to comprise a boom that bridges over the plant or row of plants. Particular arrangements may be used to blow airstreams or apply substance onto both sides of multiple rows of plants.

Fan units may be arranged to blow airstreams and/or apply substance to foliage of plants from multiple angles including, for example, from the side, from directly above, from an angle above and from an angle below. Accordingly, in some embodiments, the fan units are arranged to blow airstreams and/or apply substance to foliage of a plant from above and below the foliage. In these embodiments, the frame typically comprises at least a substantially vertical boom.

As is evident from the above discussion, mobile blowers and mobile sprayers may comprise a number of different configurations of fan units. Use of a drive system that includes flexible cable drives may allow a greater flexibility in design as the flexible cable drives may be arranged to bend around structural obstacles and allow relative movement between components.

In particular embodiments, the frame is adjustable to change the configuration of the fan units or the distance between the fan units. Adjustment of the frame may be useful if the mobile blower or mobile sprayer is desired to be used on a variety of plants, on plants of different maturity, on plants planted in rows of varying width and for compacting the system during transport or storage. The flexible cable drives are advantageous in these embodiments as their flexibility affords greater rearrangement of the frame than inflexible mechanical drives.

Embodiments including substance dispensing elements may be used to apply desired substances to plants. The substances may include, for example, water, a herbicide, a pesticide or a nutrient mix. While it is envisaged that the main application of mobile sprayers will be for the application of liquids to plants, the mobile sprayer may also be used to apply a powder, suspension or emulsion to the plants. The substance is provided to the fan unit(s) by the substance supply. The substance supply may be connectable to a substance reservoir. In this regard, the substance supply may be a pipe or hosing that is connectable to a tank. For example, the reservoir may comprise a tank with a 400 liter to 5000 liter capacity. The substance reservoir may be located on a towing vehicle or a trailer. Alternatively, the substance supply itself may include a substance reservoir.

In various embodiments, the rotary power transferred from the rotary power source may be also used to dispense substance from the substance supply through the substance dispensing element(s). For example, in addition to driving the fan of the fan units, the rotary power from the rotary power source may also be used to pressurise the substance supply or to power a pump. Alternatively, an alternate power source may be used to dispense the substance from the substance supply through the substance dispensing element(s) including, for example, an electric pump or the hydraulics of the vehicle towing or carrying the mobile sprayer.

It will also be appreciated that the mobile blower or mobile sprayer may be used in motion (i.e. towed by a tractor, or other towing means, to blow or apply a substance to rows of plants) or used stationary (i.e. when a tractor, or other towing means, is parked to blow or apply a substance to a particular area of plants).

The use of flexible cable drives in drive systems according to the present invention may also allow for a reduction in weight of the system when compared to other systems including, for example, hydraulic driven blowers or sprayers and may also reduce the level of maintenance required.

DESCRIPTION OF THE EMBODIMENTS ILLUSTRATED IN THE DRAWINGS

Figure 1:
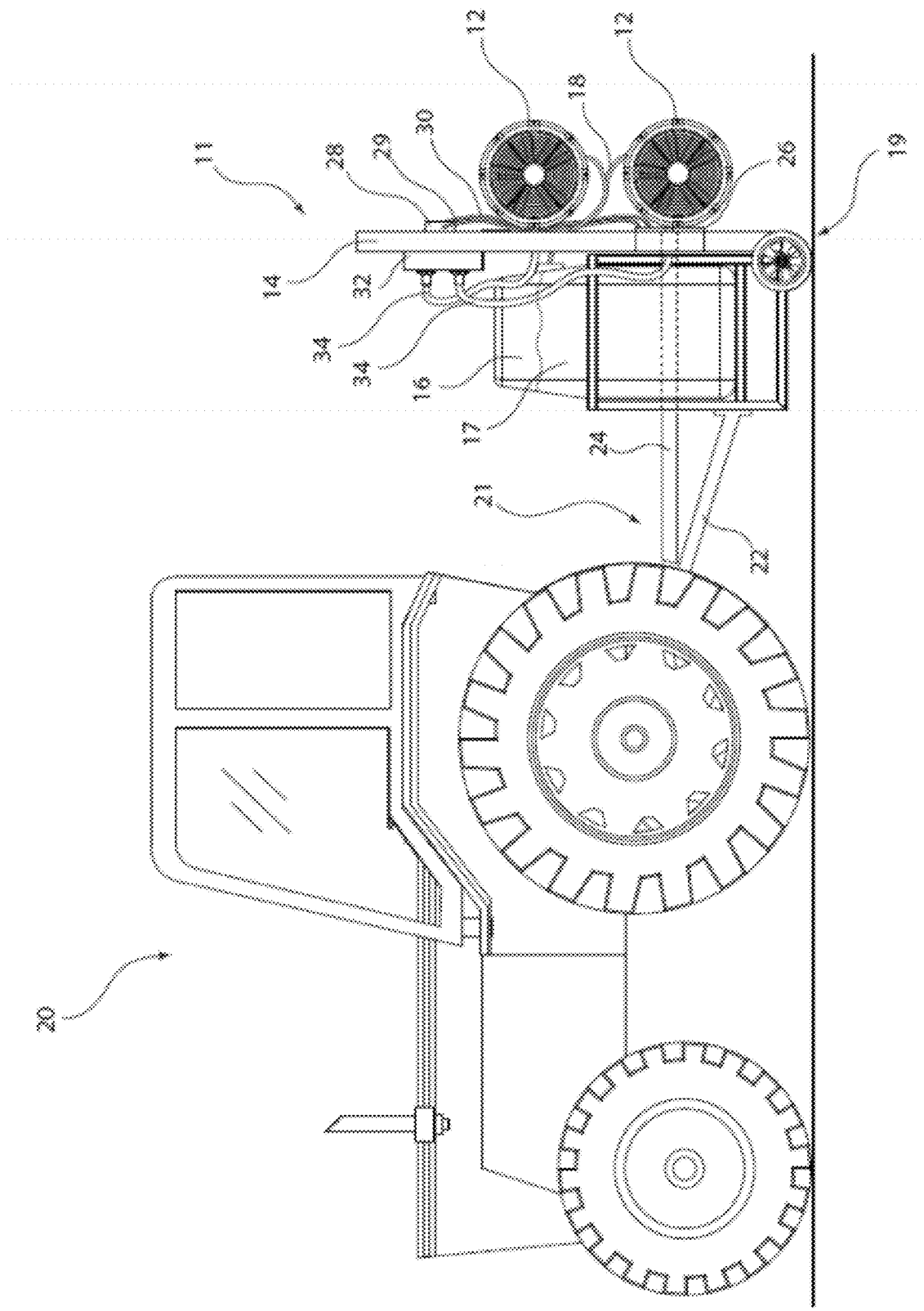
FIG. 1 shows a side view of a mobile sprayer including a drive system in accordance with an embodiment of the invention, the mobile sprayer being towed by a tractor.

Reference will now be made to illustrations of drive systems and mobile sprayers that embody the above general principles of the present invention. However, it is to be understood that the following description is not to limit the generality of the above description.

A mobile sprayer 11, which includes the drive system of the invention and is illustrated in the drawings, will be described in relation to the application of a liquid 17 to plants 10. The mobile sprayer 11 is towed by a tractor 20 between rows of plants 10. In addition to driving the tractor 20, the power from the tractor 20 is used to operate fan units 12 of the mobile sprayer 11, as will be described in detail below.

Figure 2:
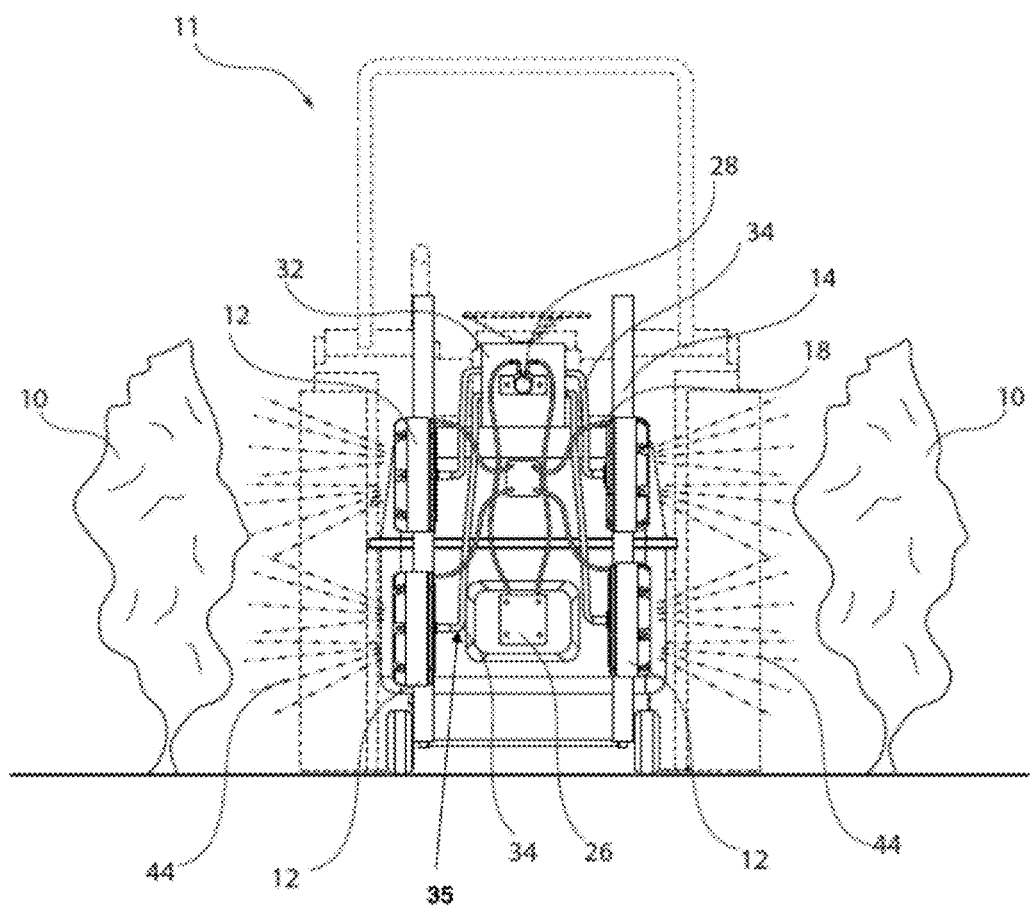
FIG. 2 shows a rear view of the mobile sprayer shown in FIG. 1, in use, applying a liquid to plants.

As shown in FIGS. 1 and 2, the mobile sprayer 11 includes fan units 12 attached to a frame 14. A reservoir 16, which includes liquid 17, is in fluid communication with fan units 12 via hoses 18. The frame 14 and the reservoir 16 are attached to a trailer 19, which is connected to a tractor 20 by a standard tow hitch 22 or other suitable means. A power take off shaft 24 is connected at one end to a power take off 21 of the tractor 20 and at the other end to a hydraulic pump 26 on the trailer 18.

In operation, the power take off 21 of the tractor 20 rotates the power take off shaft 24. The rotary power from the power take off shaft 24 acts on the hydraulic pump 26 which is connected to a hydraulic motor 28 via hydraulic hoses 29 and 30. Thus, rotary power is converted from the power take off shaft 24 to the hydraulic motor 28. The hydraulic motor 28 is connected to a gear box 32. The gear box 32 is illustrated as being located towards the top of the mobile sprayer 11 for ease of illustration. However, the gear box 32 may be located at any suitable position on the mobile sprayer 11. It will also be appreciated by a person skilled in the art that the power take off shaft 24 may directly engage with a gearbox 32, thereby omitting the need for the hydraulic pump 26 and the hydraulic motor 28. However, the inclusion of the hydraulic pump 26 and the hydraulic motor 28 in the present example allows for simple control over the speed of the fan units 12 as the speed of the hydraulic motor 28 may be adjusted directly or indirectly by adjusting the pressure settings of the hydraulic pump 26. Alternatively, the hydraulic motor 28 may be connected directly to the hydraulics of the tractor 20 and powered accordingly.

Figure 3:
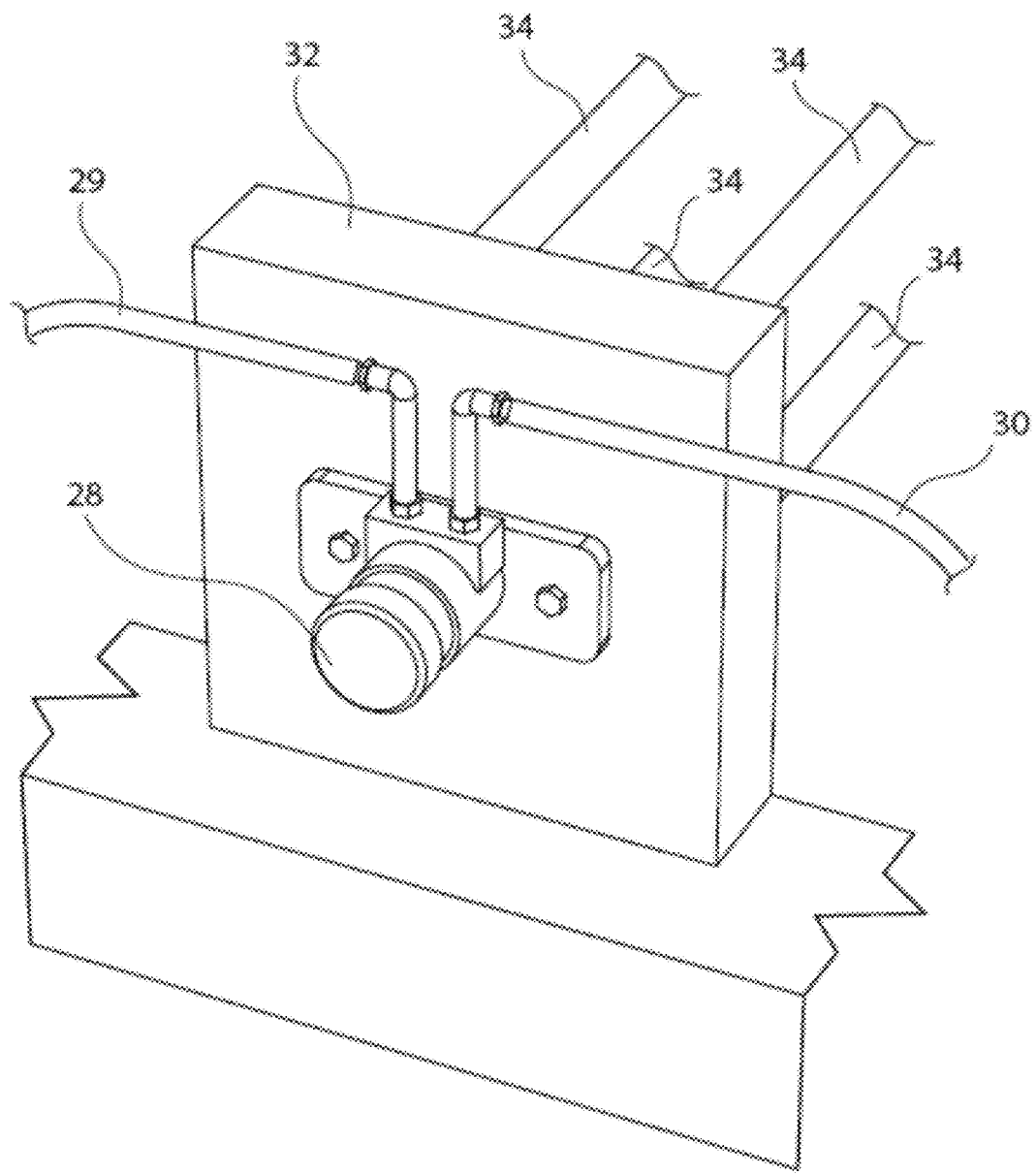
FIG. 3 shows a rear perspective view of part of the drive system of FIGS. 1 and 2, including the connections between the gear box and the hydraulic motor and flexible cable drives.
Figure 4:
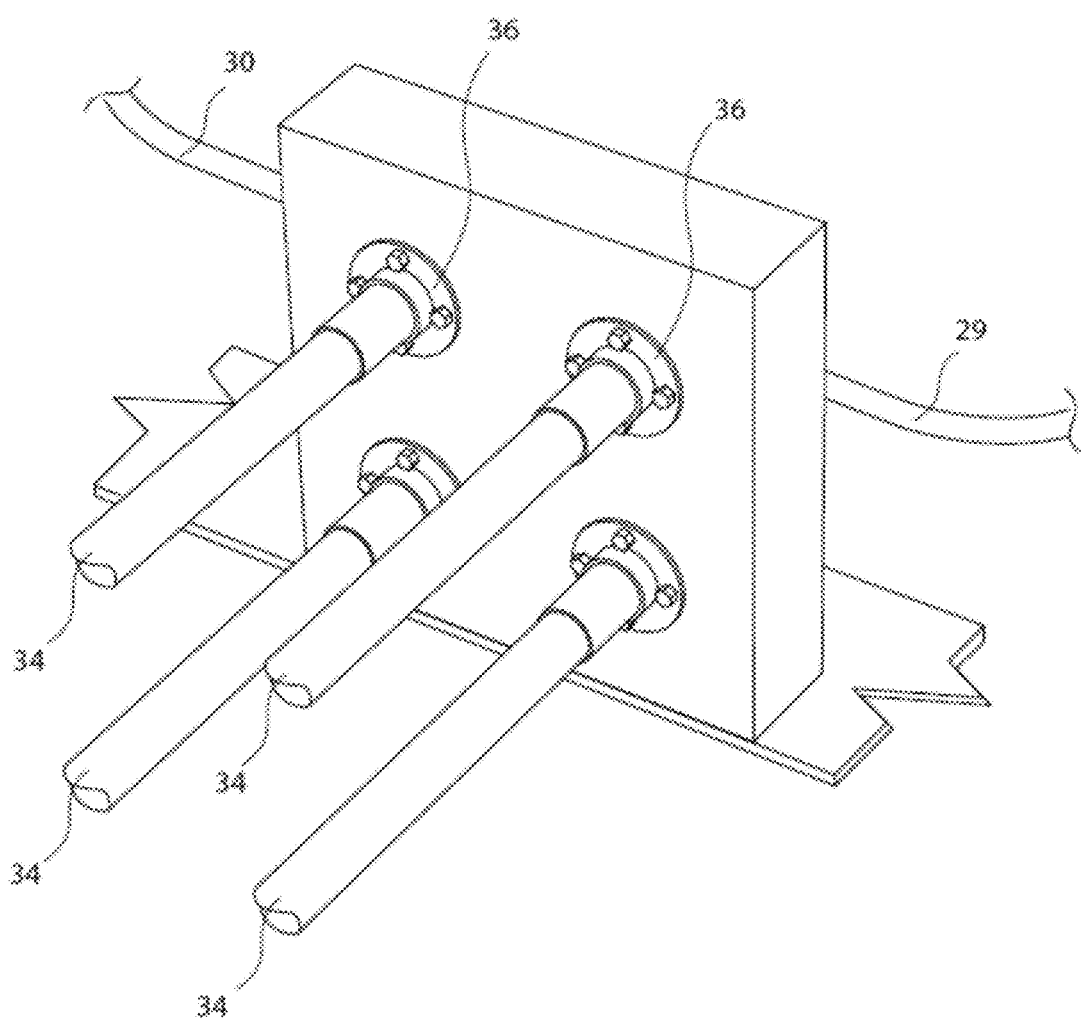
FIG. 4 shows a front perspective view of the part of the drive system shown in FIG. 3 with the connections between the gear box and flexible cable drives illustrated.

The arrangement between the hydraulic motor 28 and the gear box 32 is best illustrated in FIGS. 3 and 4. The hydraulic motor 28 receives hydraulic power from the hydraulic pump 26 through a hydraulic input hose 29. A hydraulic output hose 30 is used to return hydraulic fluid from the hydraulic motor 28 to the hydraulic pump 26. The gear box 32 receives rotary power from the hydraulic motor 28 and transfers and distributes the rotary power to the flexible cable drives 34 at flexible cable drive attachment points 36. The gear box 32 has a fixed gear ratio and the flexible cable drives 34 are in a parallel arrangement. However, it will be appreciated by a person skilled in the art that other gear boxes may be used which include variable ratios and/or allow the individual flexible cable drives 34 to be operated independently.

In some embodiments, the hydraulic motor may be "soft started". To accomplish the hydraulic "soft start", a hydraulic accumulator (not illustrated) pre charged with nitrogen may be incorporated between the hydraulic pump 26 and the hydraulic motor 28. The pressure in the accumulator is set lower than the hydraulic system pressure so that on startup, as the pressure is building up, the oil goes to the easiest path, which is the accumulator, and much like a spring, it compresses the bladder inside the accumulator causing a delayed build up in system pressure. The accumulator may be used to slow the acceleration of the hydraulic motor 28 upon initiation of the hydraulic pump 26 by 1-4 seconds. The "soft start" can prevent the flexible cable drives 34 and fans 38 from being jerked to full speed upon start up, thereby reducing the incidence of damage to the hydraulic motor 28, the flexible cable drives 34 and/or the fans 38.

Figure 4A:
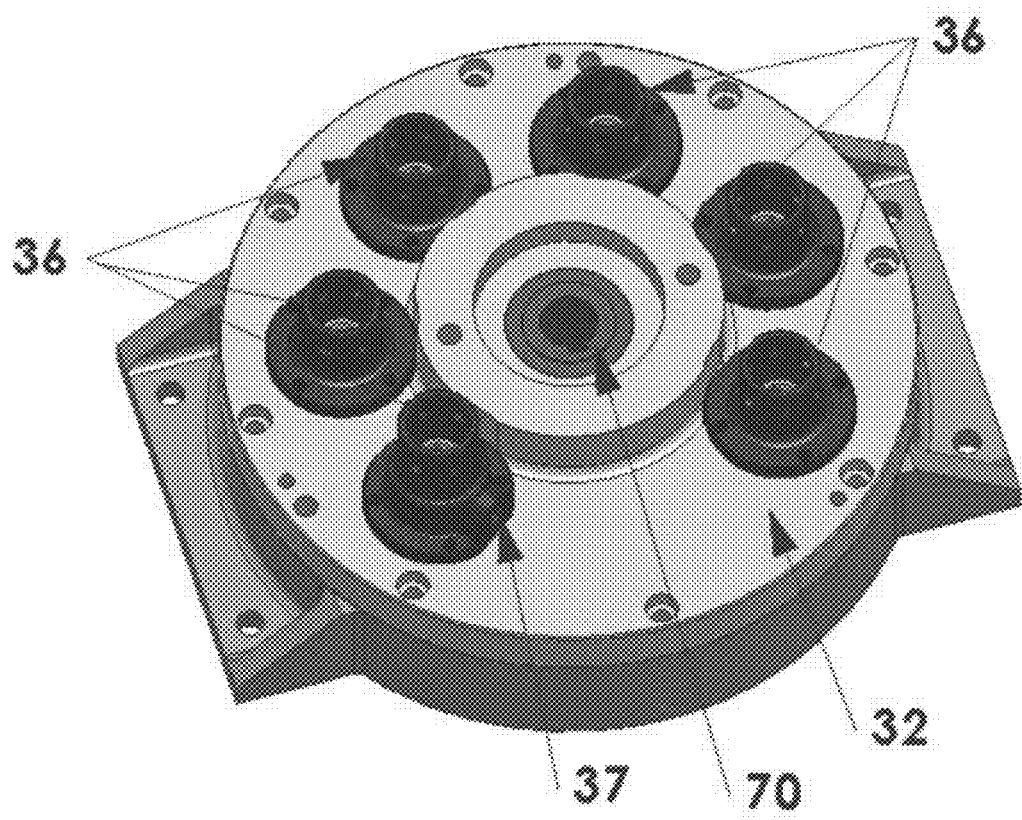
FIG. 4A shows a perspective view of an alternative gear box arrangement.
Figure 4B:
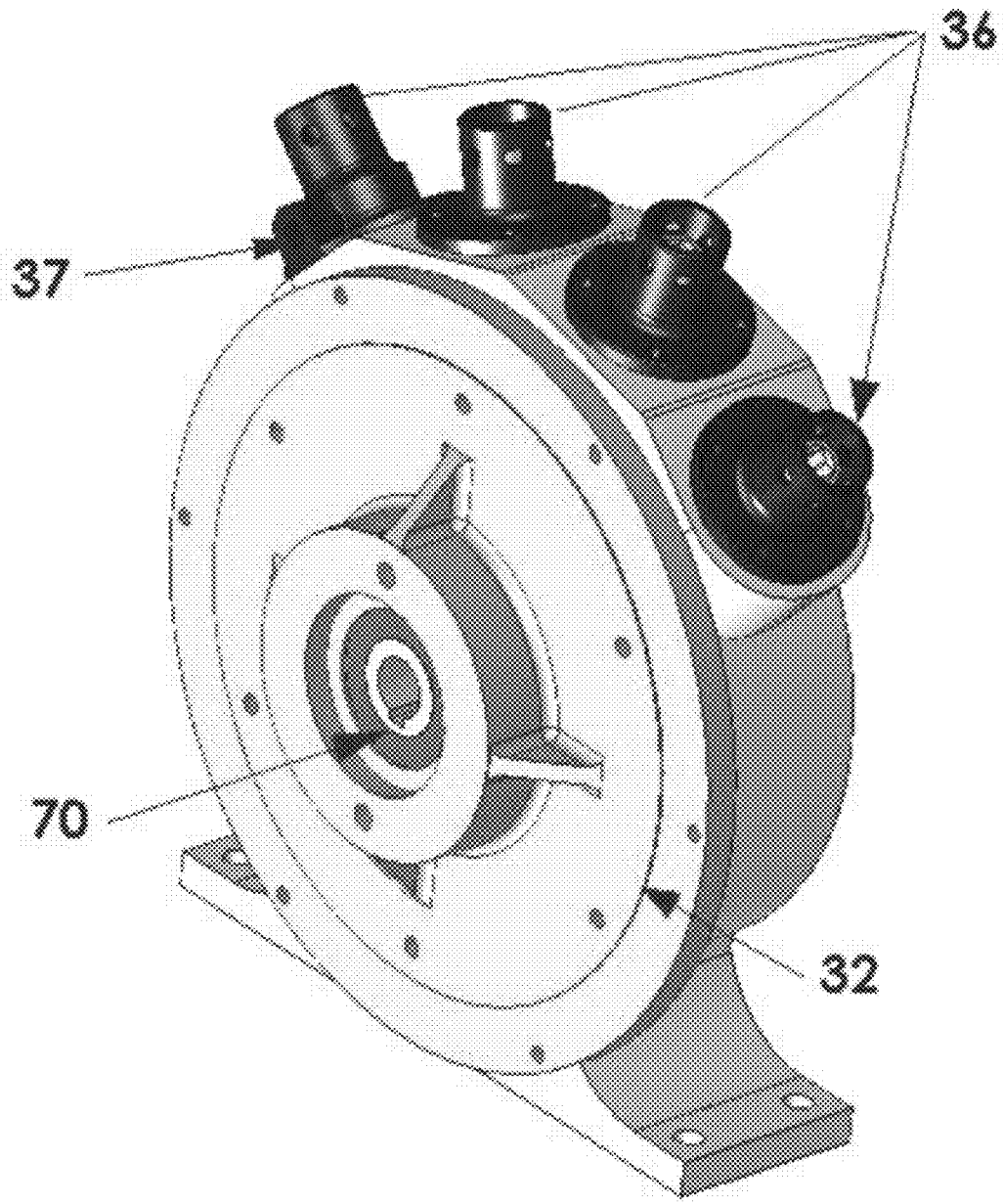
FIG. 4B shows a perspective view of an alternative gear box arrangement.

Examples of alternative gear box 32 arrangements are shown in FIG. 4A and FIG. 4B. Rotary power is transferred from the hydraulic motor (not illustrated) to the gear box 32 via a rotary input 70. As illustrated, the gear box 32 may optionally include a rpm sensor 37 at an attachment point 36, which measures the rpm of a pinion associated with the attachment point 36. In some embodiments, the gear box 32 illustrated in FIG. 4B may be advantageous in that the perpendicular arrangement of attachment points 36 relative to the rotary input 70 can minimise the number of bends required in the flexible cable drives. As can be appreciated, this will depend on the arrangement of the fan units relative to the gearbox 32.

Internally, the gear box 32 may also include a one-way overdrive clutch bearing to allow fan overdrive when powering down (not illustrated). Thus, when the rotary power source is powered down, the fan(s) 38 and/or flexible cable drive(s) 34 will come to a slower stop (e.g. 1-5 seconds slower) than the rotary power source, thereby reducing potential damage to the fan(s) 38 and/or flexible cable drive(s) 34.

Preferably, the gearbox 32 will allow an output of between 1500 rpm and 3000 rpm (i.e. the flexible cable drives and fans will operate at between 1500 rpm and 3000 rpm), although the desired output will depend on the desired blowing/spraying requirements. The speed of the input and/or the gear box ratio may be selected or adjusted to provide the desired output. For example, a gear box input of 360-520 rpm and a gear box ratio of 5.5 will allow an output of 1980 to 2860 rpm. A gear box input of around 1100 rpm will best suit a gear box ratio of around 1.4 to around 2.7.

Returning to FIG. 2, each flexible cable drive 34 engages a fan unit 12 via a right angle drive 35, thus transferring the rotary power from hydraulic motor 28 to fan units 12. However, as illustrated in FIG. 7 straight drives may be used to connect each flexible cable drive 34 to the fan units 12. The rotary power transferred by the flexible cable drives 34 drives the fans 38 (illustrated in FIGS. 5 to 7) of the fan units 12.

Figure 5:
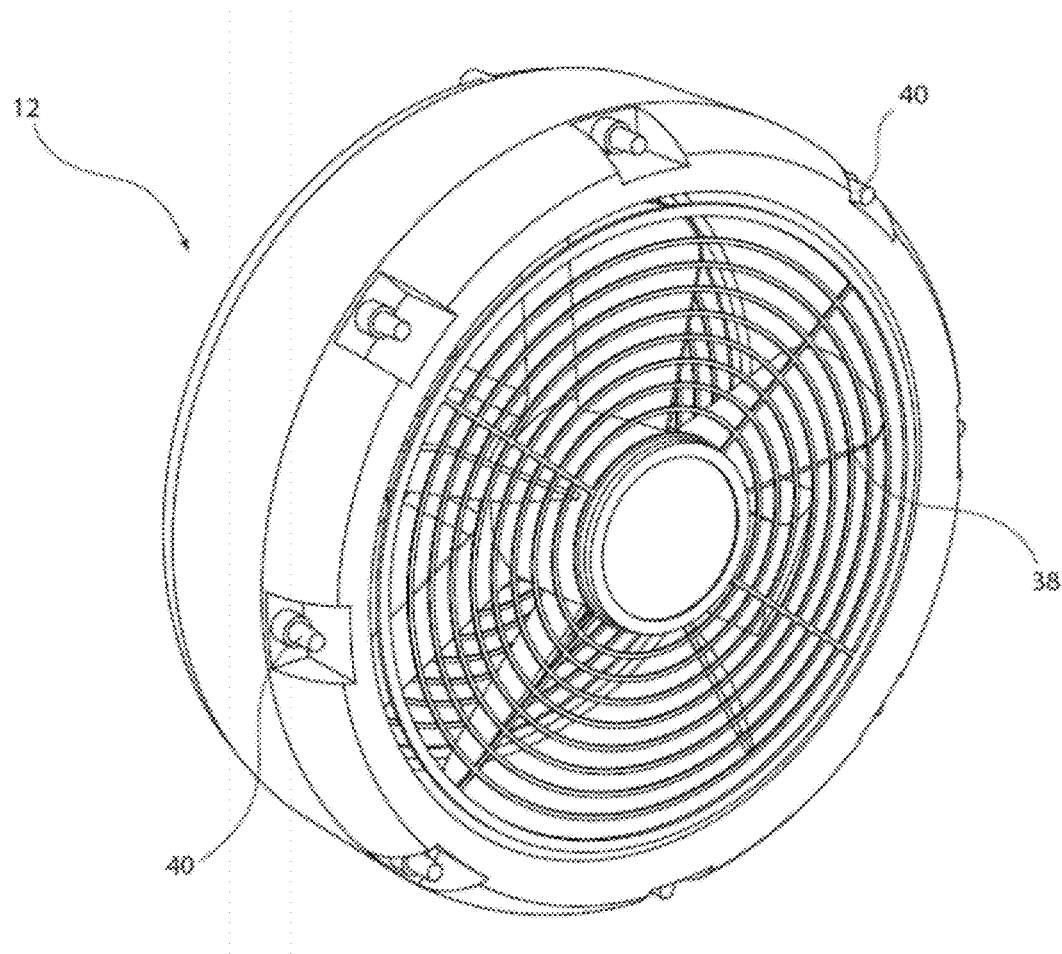
FIG. 5 shows an isolated front perspective view of a fan unit of FIG. 1.
Figure 6:
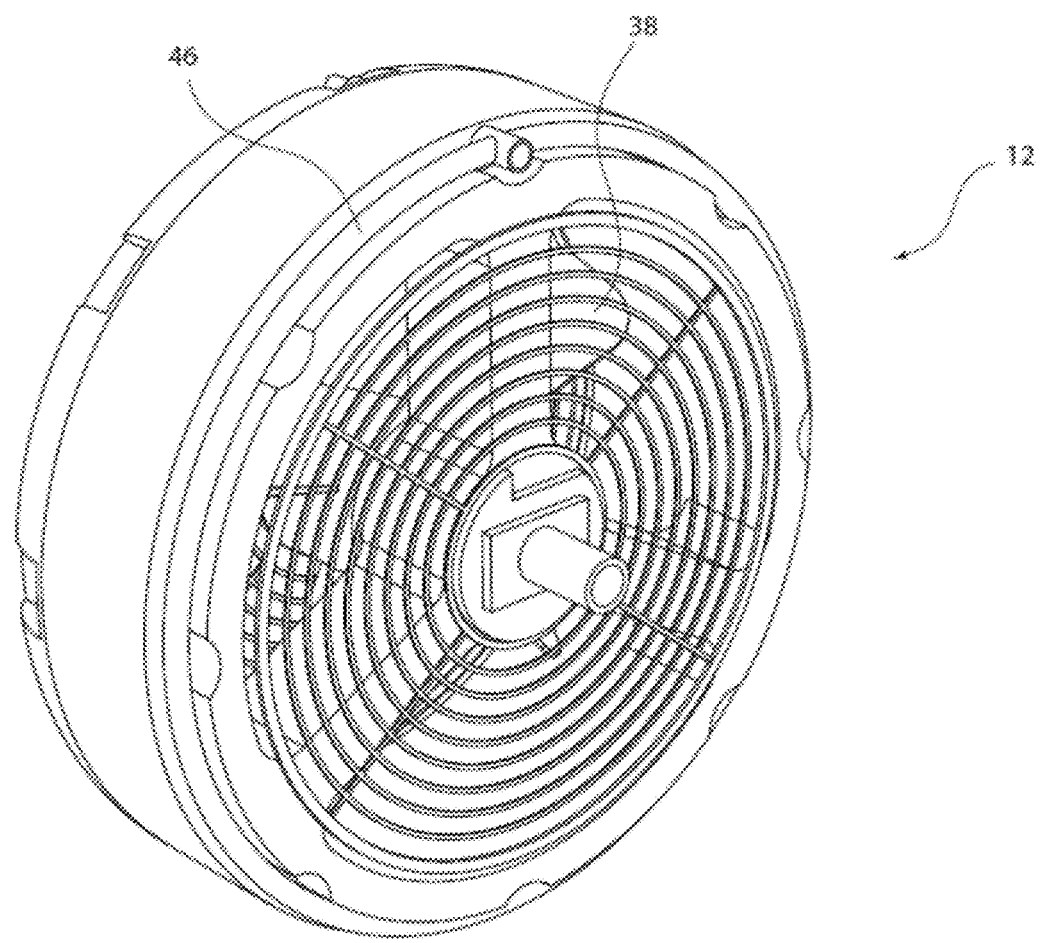
FIG. 6 shows an isolated rear perspective view of a fan unit of FIG. 1.
Figure 7:
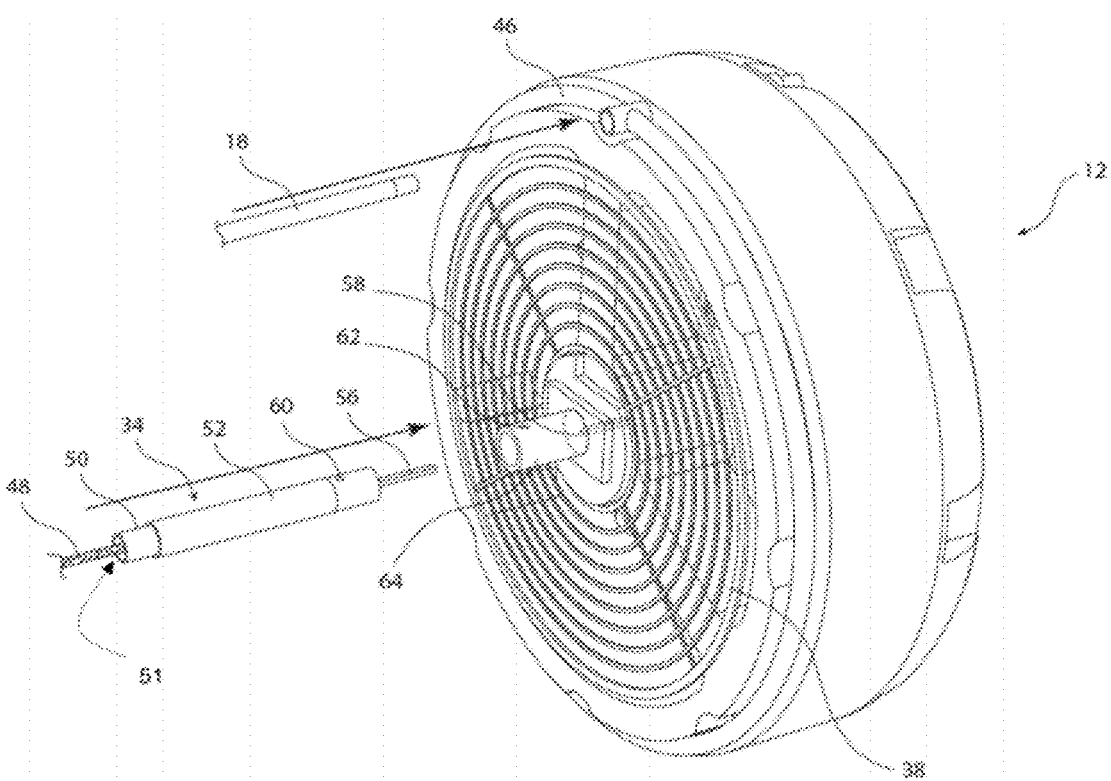
FIG. 7 shows a perspective breakaway view of the components of a flexible cable drive and connection to a fan unit in accordance with an embodiment of the present invention.

The fan units 12 are best illustrated in FIGS. 5 and 6. Each fan unit 12 includes a fan 38 and nozzles 40. The nozzles 40 are arranged to dispense a liquid 17 into the airstream generated by the fan 38 to propel the liquid 17 as a spray 44 onto plants 10 (as illustrated in FIG. 2). While different fan speeds may be used by adjusting the rotary speed of the power take off shaft 24, the pressure generated by the hydraulic pump 26, the speed of the hydraulic motor 28 or the gear ratio of the gearbox 32 (when a variable ratio gearbox is used), good spraying results have been obtained using a fan speed of between 1750 rpm and 2600 rpm.

To facilitate spraying, the liquid 17 is pumped from the reservoir 16 through hoses 18 to the fan unit 12 by utilising a pump, such as a positive displacement diaphragm pump (not illustrated), which may be driven by the power take off shaft 24 through a pressure controller valve or an independent power source. However, it will be appreciated that any means of pumping the liquid 17 may be used including, for example, a pump powered by the hydraulic pump 26, the hydraulic motor 28, the hydraulics of tractor 20, a battery or an alternate power source. The liquid 17 is distributed from the hose 18 to the nozzles 40 through a distributer piping 46 (as illustrated in FIG. 6).

To adapt to plants of different sizes or for plants planted in different row configurations (i.e. varying distances between rows), the angle of the fan units 12 relative to the frame 14 or the position of the fan units 12 along the frame 14 may be adjusted by adjusting the frame connector (not illustrated). Alternatively, the frame 14 may be moved into a different configuration by pivoting and/or hinging.

A representative flexible cable drive is shown in detail in FIG. 7. The flexible cable drive 34 has a core 48 with a diameter of about 12 mm to 13 mm. The flexible cable drive 34 has a flexible casing 51, which consists of a flexible steel conduit 50 covered with PVC/urethane/rubber sheath 52. The flexible casing 51 has a 15 mm to 16 mm inner diameter and 26 mm outer diameter. These flexible cable drives 34 have a recommended operational speed of 2200 rpm to 2600 rpm, with a maximum speed of 3000 rpm and a recommended minimum bend radius of around 240 mm (although tighter bends may be used), which allows the flexible cable drives 34 to bend around components of the mobile sprayer 11. While a specific flexible cable drive has been described, it will be appreciated that flexible cable drives of differing specifications may also be used.

Each end of the core 48 of the flexible cable drive 34 is formed with a square male end 56 to allow engagement with complementary female adaptors 58 on the gearbox 32 (not illustrated) and the fan unit 12 (as illustrated in FIG. 7). Rotation of the female adaptor 58 on the gearbox 32 (not illustrated) engages and rotates the square male end 56, which results in the rotation of the core 48 and the square male end 56 at the opposite end. The square male end 56 at the opposite end engages and rotates the female adaptor 58 on the fan unit 12, which drives the fan 38 of the fan unit 12. Attached to each end of the flexible casing 51 is one or more 22 mm diameter push button quick release couplings 60 that locates into the aperture 62 of the support element 64 fixed to the gearbox 32 and the fan unit 12. Engagement between the quick release couplings 60 and the aperture 62 prevents rotation of the flexible casing 51.

Figure 8:
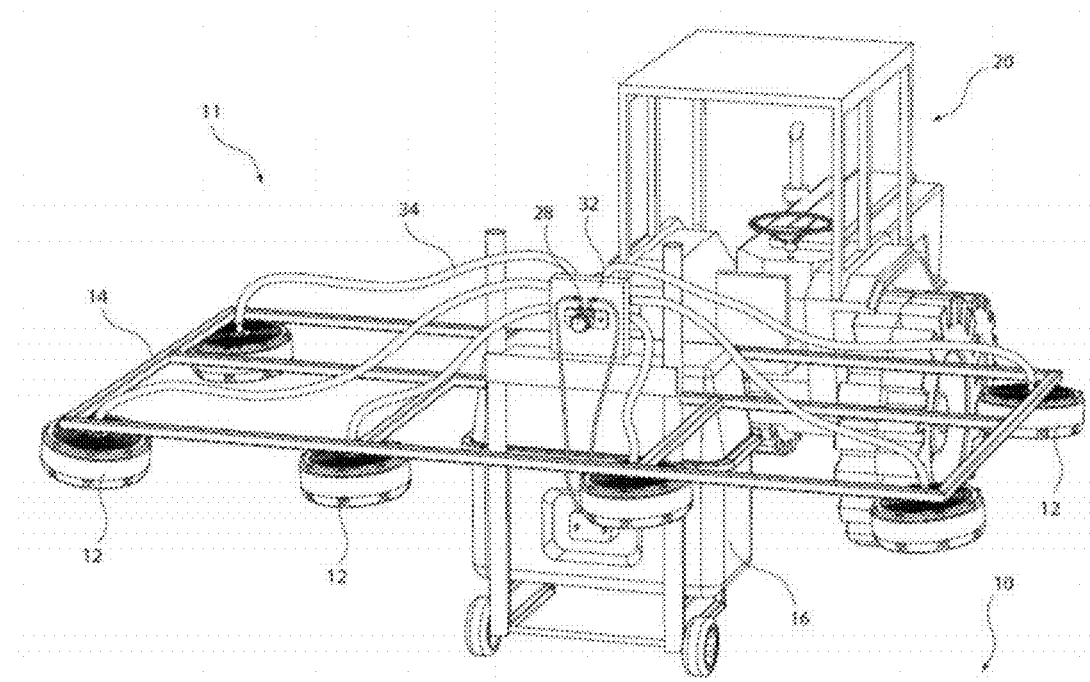
FIG. 8 shows a perspective view of a mobile sprayer, including a drive system in accordance with an alternative embodiment of the invention, that is suitable for applying a liquid to rows of small plants.
Figure 9:
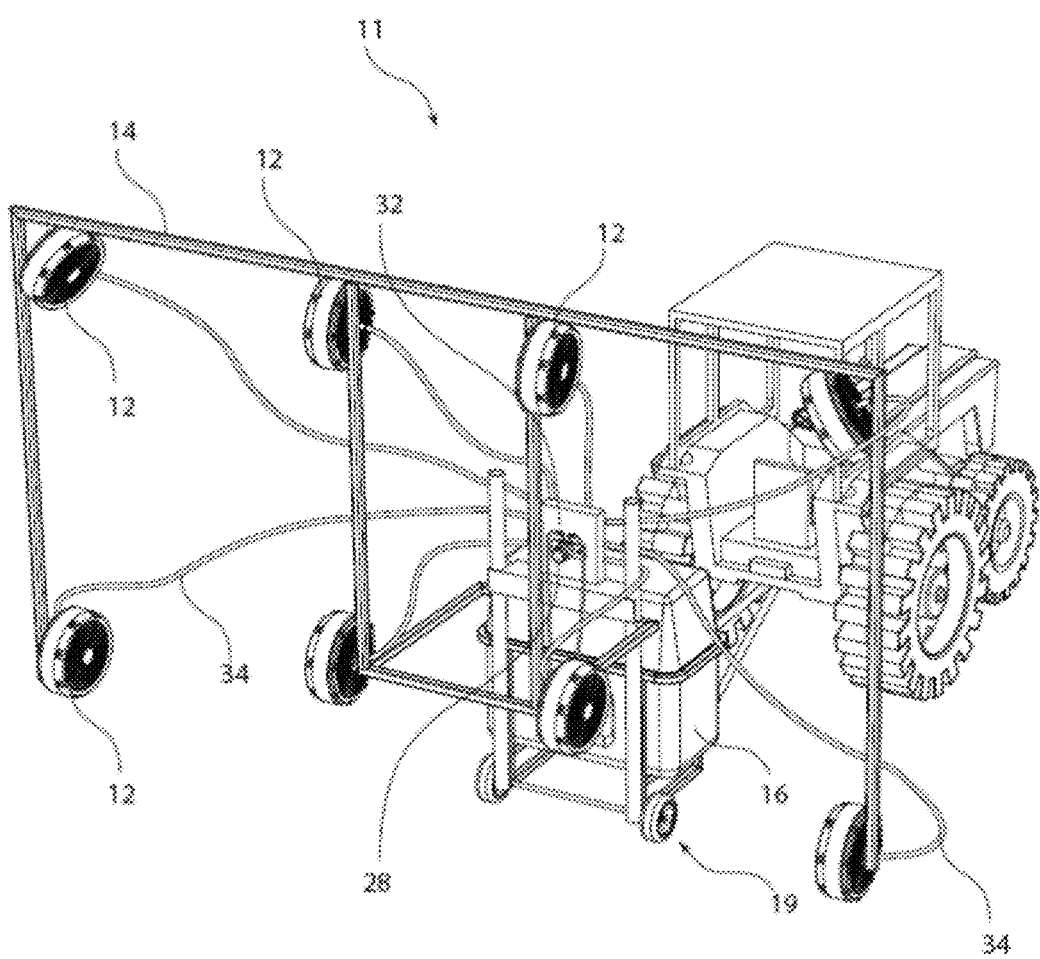
FIG. 9 shows a perspective view of a mobile sprayer, including a drive system in accordance with an alternative embodiment of the invention, that is suitable for applying a liquid to multiple sides of multiple rows of plants.

As illustrated in FIG. 2, the mobile sprayer 11 is particularly suited to applying the liquid 17 to the plants 10 arranged in rows, with the mobile sprayer 11 applying the liquid 17 to the plants 10 from between the rows. FIGS. 8 and 9 illustrate other mobile sprayers 11 in accordance with the present invention that are suitable for smaller plants 10 and application of liquid to both sides of one or more rows of the plants 10, respectively. While the mobile sprayers 11 illustrate the flexible cable drives 34 in a parallel arrangement, the mobile sprayers 11 shown in FIGS. 8 and 9 may be particularly suited to at least some flexible cable drives 34 being arranged in a series arrangement to minimise the length of the flexible cable drives 34 required. For example, pairs of closely located spray units 12 may be connected in a series arrangement via T-section gear boxes (not illustrated) to minimise the overall length of flexible cable drives used.

Each fan unit 12 in FIGS. 8 and 9, would in use be connected to the reservoir 16 by hoses 18. However, to more clearly illustrate the arrangement of the flexible cable drives, hoses 18 have been omitted from these figures. If the reservoir 16 of FIGS. 8 and 9 were omitted, the figures would be representative of embodiments of mobile blowers, also in accordance with the present invention. Such mobile blowers may be used to blow airstreams onto plants for purposes, which may include, for example, the removal of debris, drying of the plants or treatment/removal of fungus or other pests.

While not illustrated in FIGS. 2, 8 and 9, flexible cable drives 34 will preferably be fastened to frame 14 at one or more points along the flexible cable drives 34 to provide support when in use. Any suitable fastening method may be used (e.g. hooks, loops, clamps, cable ties, apertures through the frame, etc).

While the specific embodiments described above utilise hydraulic power to drive the flexible cable drives, it will be appreciated that other embodiments may include different rotary power sources and/or arrangements. For example, the flexible cable drives 34 may be powered by an electric motor, which is powered by a battery, a generator or a power take off shaft 24. As a further example, the flexible cable drives 34 may be powered by direct engagement with a power take off shaft 24, an electric motor or a gear box 32. The gear box 32 may be powered electrically, hydraulically or mechanically (i.e. by direct engagement with a power take off shaft 24). Indeed, in some embodiments, the mobile sprayer may not have a gear box.

The claims defining the invention are as follows:

1. A drive system for a mobile blower, the mobile blower including:
    i) a frame; and
    ii) at least one fan unit for generating an airstream, each fan unit including a fan;
    wherein the drive system includes at least one flexible cable drive, and wherein, in use, the at least one fan unit is attached to the frame and a flexible cable drive, the flexible cable drive being engageable with a rotary power source for transferring rotary power from the rotary power source to the at least one fan unit to drive the fan(s);
    wherein the rotary power source is a power take off shaft, an electric motor, an internal combustion motor, or a hydraulic motor;
    wherein the drive system includes a soft start provided by a hydraulic accumulator.

2. A drive system for a mobile sprayer, the mobile sprayer including:
    i) a frame; and
    ii) at least one fan unit for generating an airstream, each fan unit including a fan and at least one substance dispensing element for dispensing a substance into the airstream to generate a spray;
    wherein the drive system includes a soft start and at least one flexible cable drive, and wherein, in use, the at least one fan unit is attached to the frame and a flexible cable drive, the flexible cable drive being engageable with a rotary power source for transferring rotary power from the rotary power source to the at least one fan unit to drive the fan(s);
    wherein the rotary power source is a power take off shaft, an electric motor, an internal combustion motor, or a hydraulic motor;
    wherein the soft start is provided by a hydraulic accumulator.

3. A drive system according to claim 1, including a gearbox to which the at least one flexible cable drive is connected to modulate the rotary power from the rotary power source.

4. A drive system according to claim 3, wherein the gearbox comprises fixed or variable gear ratios of between 1 and 8.

5. A drive system according to claim 1, wherein the angle or position of the fan unit(s) is adjustable.

6. A drive system according to claim 1, wherein the fan unit is an axial fan unit, a tangential fan unit or a turbine fan unit.

7. A drive system according to claim 1, wherein the system comprises multiple fan units.

8. A drive system according to claim 7, wherein multiple fan units are arranged in a parallel drive arrangement from a gearbox.

9. A drive system according to claim 7, wherein multiple fan units are arranged in a series drive arrangement.

10. A drive system according to claim 9, wherein one or more fan units arranged in the series drive arrangement includes a T section gearbox.

11. A drive system according to claim 1, wherein the one or more fans are driven by the flexible cable drives to operate at between 1000 rpm and 4000 rpm.

12. A drive system according to claim 7, wherein the fan of at least one fan unit is able to be driven independent to the fan of at least one other fan unit.

13. A mobile blower for blowing an airstream onto plants, the system including:
    i) a frame;
    ii) a drive system including at least one flexible cable drive; and
    iii) at least one fan unit for generating an airstream, each fan unit including a fan; and
    wherein the at least one fan unit is attached to the frame and a flexible cable drive, the flexible cable drive being engageable with a rotary power source for transferring rotary power from the rotary power source to the at least one fan unit to drive the fan(s);
    wherein the rotary power source is a power take off shaft, an electric motor, an internal combustion motor, or a hydraulic motor;
    wherein the drive system includes a soft start provided by a hydraulic accumulator.

14. A mobile blower according to claim 13, wherein the rotary power source is provided by a vehicle.

15. A mobile blower according to claim 13, wherein at least one flexible cable drive is connected to a gearbox to modulate the rotary power from the rotary power source.

16. A mobile blower according to claim 15, wherein the gearbox comprises multiple gear ratios.

17. A mobile blower according to claim 13, wherein the angle or position of the fan unit is adjustable.

18. A mobile blower according to claim 13, wherein the fan unit(s) include one or more axial fan units, tangential fan units or turbine fan units.

19. A mobile blower according to claim 13, wherein the system comprises multiple fan units.

20. A mobile blower according to claim 19, wherein multiple fan units are arranged in a parallel drive arrangement from a gearbox.

21. A mobile blower according to claim 19, wherein multiple fan units are arranged in a series drive arrangement.

22. A mobile blower according to claim 21, wherein one or more fan units arranged in the series drive arrangement include a T section gearbox.

23. A mobile blower according to claim 19, wherein the fan of at least one fan unit is able to be driven independent to the fan of at least one other fan unit.

24. A mobile blower according to claim 19, wherein fan units are arranged to allow concurrent blowing of multiple rows of plants.

25. A mobile blower according to claim 19, wherein fan units are arranged to straddle a plant or row of plants to allow concurrent blowing of both sides of the plant or row of plants.

26. A mobile blower according to claim 19, wherein fan units are arranged to blow foliage of a plant from above and below the foliage.

27. A mobile blower according to claim 13, wherein the blower is mounted to a vehicle or a trailer.

28. A mobile sprayer for applying a substance to plants, the system including a mobile blower according to claim 13, wherein the fan unit(s) further include(s) at least one substance dispensing element for dispensing a substance into the airstream(s) to generate a spray, the at least one substance dispensing element being in fluid communication with a substance supply.

29. A mobile sprayer according to claim 28, wherein rotary power transferred from the rotary power source is also used to dispense the substance from the substance supply through the substance dispensing element.

30. A mobile sprayer according to claim 28, wherein an alternate power source is used to dispense the substance from the substance supply through the substance dispensing element.

31. A mobile sprayer according to claim 28, wherein the substance supply is connectable to a reservoir.

32. A mobile sprayer according to claim 28, wherein the substance supply includes a reservoir.

33. A mobile sprayer according to claim 28, wherein the substance is a liquid.

34. A mobile sprayer according to claim 28, wherein the substance is a powder.

\* \* \* \* \*